United States Patent
Wen

Patent Number: 6,106,622
Date of Patent: Aug. 22, 2000

[54] FORMING OPTICAL STRUCTURES ON RECEIVERS

[75] Inventor: Xin Wen, Rochester, N.Y.

[73] Assignee: Eastman Kodak Company, Rochester, N.Y.

[21] Appl. No.: 08/991,699

[22] Filed: Dec. 16, 1997

[51] Int. Cl.⁷ .................................................. F16K 31/02
[52] U.S. Cl. .................... 118/668; 118/684; 118/620; 118/708
[58] Field of Search ................................. 118/684, 668, 118/620, 708

[56] References Cited

U.S. PATENT DOCUMENTS

| | | |
|---|---|---|
| 5,178,190 | 1/1993 | Mettner . |
| 5,238,223 | 8/1993 | Mettner et al. . |
| 5,259,737 | 11/1993 | Kamisuki et al. . |
| 5,276,478 | 1/1994 | Morton . |
| 5,367,878 | 11/1994 | Muntz et al. . |
| 5,400,824 | 3/1995 | Gschwendtner et al. . |
| 5,498,444 | 3/1996 | Hayes . |
| 5,636,580 | 6/1997 | Morton . |
| 5,695,561 | 12/1997 | Tomiama et al. ................. 118/620 |
| 5,723,176 | 3/1998 | Keyworth et al. ................. 118/668 |

*Primary Examiner*—Bruce Breneman
*Assistant Examiner*—Liza Pacheco
*Attorney, Agent, or Firm*—Raymond L. Owens

[57] ABSTRACT

Apparatus responsive to an input image for forming an optical structure such as a lens array on a receiver including a fluid delivery chamber having a fluid capable of forming the optical structure. The apparatus enables the fluid chamber to deliver fluid to the receiver to form the optical structure; fluid channel for delivering fluid to the fluid delivery chamber; and fluid flow regulation for regulating the fluid flow to the fluid delivery chamber and from the delivery chamber to the receiver in response to the values of the input image and for positioning the receiver relative to the delivery chamber so as to form the desired optical structure.

16 Claims, 4 Drawing Sheets

FORMING OPTICAL STRUCTURES ON RECEIVERS

CROSS REFERENCE TO RELATED APPLICATIONS

Reference is made to commonly assigned U.S. patent application Ser. No. 08/934,370, filed Sep. 19, 1997 (76578) entitled "Ink Jet Printing With Radiation Treatment"; commonly assigned U.S. patent application Ser. No. 08/986,950, filed Dec. 16, 1997 (77056)entitled "Image Display and Audio Device"; and commonly assigned and concurrently filed U.S. patent application Ser. No. ,(77081)entitled "Producing a Lenticular Lens Array for a Multiple Image Display." The disclosure of these related applications is incorporated herein by reference.

FIELD OF THE INVENTION

The present invention relates to apparatus for producing an optical structure on a receiver.

BACKGROUND OF THE INVENTION

The fabrication of micro-optical components onto optical substrates is the subject of the U.S. Pat. No. 5,498,444. The technique disclosed involves the use of an ink jet droplet dispensing technology to dispense droplets of optical materials on the optical substrates. Due to the discrete nature of the droplets, however, several disadvantages exist with this prior art technique. First, it is difficult for a multiple of droplets to form a smooth optical surface which is usually required for optical applications. This difficulty is particularly severe when a long optical object such as a cylindrical lens or an optical circuit is to be formed. Furthermore, as it is well known in the art, the need for the ejection and formation of separate droplets in the air also demand stringent requirements on the properties of the optical materials.

SUMMARY OF THE INVENTION

An object of this invention is to provide a fluid transfer apparatus for forming optical structures on a receiver.

Another object of this invention is to provide a fluid transfer apparatus for fabricating an optical structure on a receiver without the need of ejecting discrete droplets.

These objects are achieved by an apparatus responsive to an input image for forming an optical structure such as a lens array on a receiver, comprising:

a) a fluid delivery chamber having a fluid capable of forming the optical structure and including means for enabling the fluid chamber to deliver fluid to the receiver to form the optical structure;

b) fluid channel for delivering fluid to the fluid delivery chamber; and c) fluid flow regulation means for regulating the fluid flow to the fluid delivery chamber and from the delivery chamber to the receiver in response to the values of the input image and for positioning the receiver relative to the delivery chamber so as to form the desired optical structure.

ADVANTAGES

One feature of the apparatus in accordance with the present invention is that the fluid can be transferred continuously from the fluid transfer apparatus to a receiver.

Another feature of the apparatus in accordance with the present invention is that the fluid transfer to a receiver is regulated in the fluid transfer apparatus.

Still another feature of the apparatus in accordance with the present invention is that only a static fluid pressure is needed in the fluid transfer apparatus.

DETAILED DESCRIPTION OF THE INVENTION

The present invention is described in relation to a fluid transfer apparatus for transferring a fluid to form a optical structure on a receiver substrate in a spatial pattern. In particular, the optical structure can be optical components such as lenses, wave guide, optical coupler, optical mixers etc. The receiver substrate can include a ceramic material, semiconductor material such as silicon, germanium, AlGa, AlGaAs etc., glass, colorant receivers such as paper and synthetic paper, metallic materials and fabrics.

Figure 1:
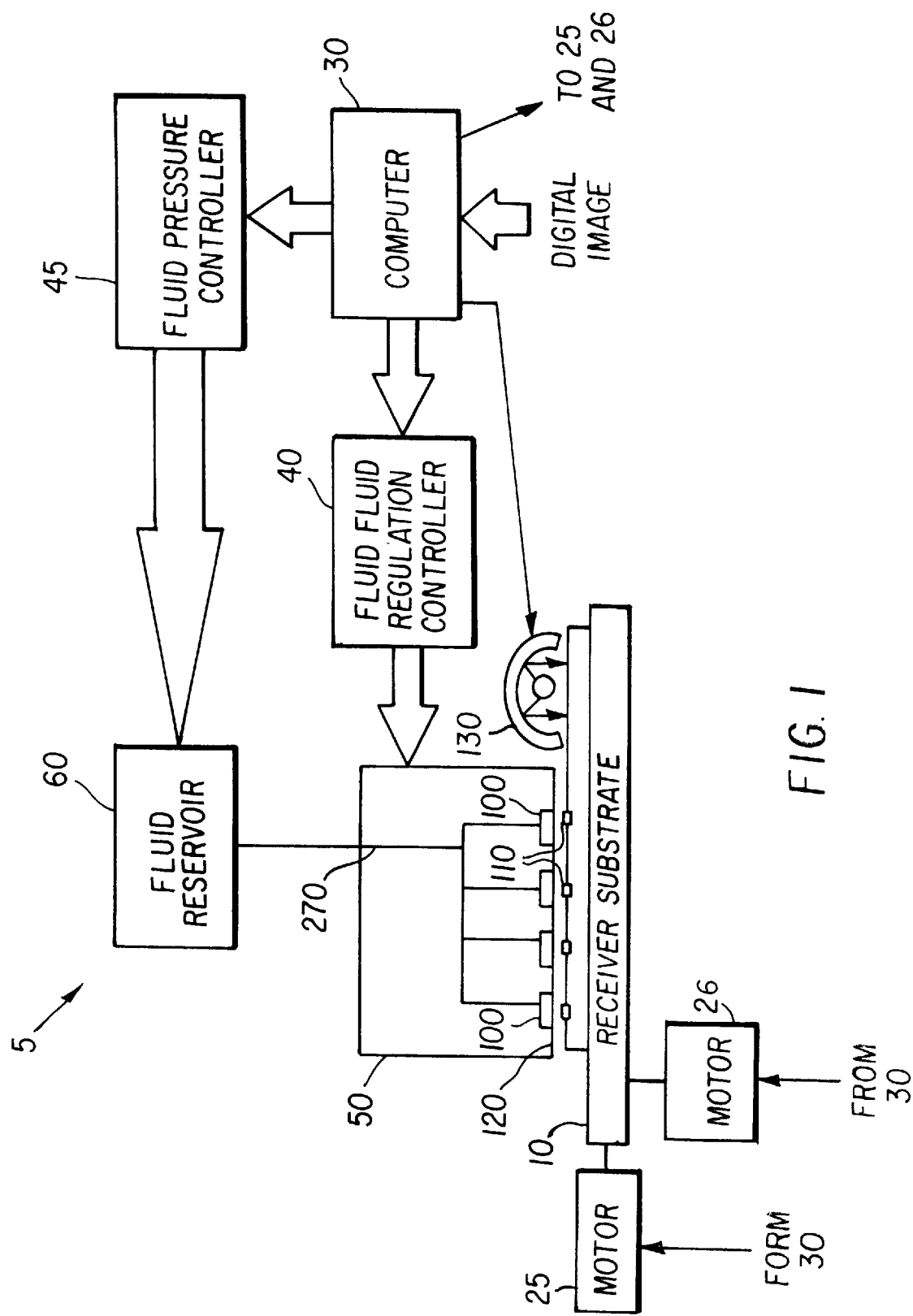
FIG. 1 is a block diagram showing a fluid transfer apparatus for printing an image onto a receiver substrate in the present invention.

Referring to FIG. 1, a system block diagram is shown of a fluid transfer apparatus 5 in accordance with the present invention. A digital image can be input to the computer 30 from a magnetic disk, a compact disk (CD), a memory card, a magnetic tape, a digital camera, a print scanner, or a film scanner, and the like. Alternatively, the image can be produced by a computer 30.

The computer 30 controls a fluid pressure controller 45 and a fluid regulation controller 40. The pressure controller 45 controls the pressures in a fluid reservoir 60. A fluid transfer device 50 is connected with the fluid reservoir 60. The fluid pressure in the fluid reservoir 60 can be controlled by accurately positioning the height of the top fluid surface in the fluid reservoir 60. Alternately, the fluid can be contained in rubber bladders. The fluid pressure can be controlled by varying mechanical forces exerted on the rubber bladders.

One advantage in accordance with the present invention is that only a static pressures can be used to drive the transfer of the fluid in the fluid reservoir 60. The fluid pressure is not varied during the fluid transfer process. This represents a simplification of the pressure pulses required in ejecting fluid in the prior art techniques.

The fluid transfer from the fluid transfer device 50 to the receiver substrate 10 is controlled by the fluid flow regulation controller 40. The fluid is transferred to a receiver substrate 10 from the fluid delivery chamber 100 to form the optical structure 110. In an alternate arrangement, a plurality of microchannels 270 can carry several fluids to one fluid delivery chamber 100 before being delivered to the receiver substrate 10. The fluid transfer from fluid transfer device 50 can be regulated by several different micromechanical devices, as descried below in relation to FIGS. 2 and 3, in a fluid delivery chamber 100. The fluid flow regulation controller 40 is an electronic device that sends control signals to switch the above micromechanical devices from a closed position to a plurality of open positions (see FIGS. 2 and 3). The duration of the microvalve 220 at each position is determined by the time separation between these control signals. The receiver substrate 10 can be transported laterally across the fluid delivery chambers 100 by motor 25. The receiver substrate 10 is transported by motor 26 in the vertical direction to the vicinity of the front plate 120 of the fluid transfer device 50. The distance between the front plate 120 and the receiver substrate 10 can thus be adjusted by motor 26, which can be used to control the height and width of the optical structure 110. Motors 25 and 26 are used to position the receiver substrate 10 relative to the fluid delivery chambers 100. Both motors 25 and 26 are controlled by computer 30.

Many different materials can be used for receiver substrates 10 in accordance with the present invention. For example, the receiver substrate include glass, metal, ceramics, polymeric, fabrics, semiconductor materials, paper or synthetic paper.

The fluid 210 in accordance with the present invention can include optical materials such as optical wax, optical epoxy, optical glass, and optical glasses. The fluids can also include radiation curable materials such as those disclosed in the above referenced, commonly assigned U.S. patent application Ser. No. 08/934,370, filed, Sep. 19, 1997 (docket 76,568) entitled "Ink Jet Printing With Radiation Treatment" by Wen. In FIG. 1, a UV light source 130 is shown capable of treating the fluid delivered to the receiver substrate by UV irradiation to form the optical structure. In addition, other components can also be added for modifying the surface tension and viscosity of the fluids. The fluids have enough surface tension and/or viscosity so that when the fluid does not spread too much during or before being fixed by the UV radiation. The fluid transferred on the receiver substrate 10 can also be treated by heating or chemicals so that the fluid will fix to form a optical structure 110.

It is noted that one advantage of the present invention is that the requirements on the properties of the fluids 210 are much relaxed with the fluid transfer apparatus 5 compared to the prior art ink jet fluid dispensing technology because the fluid does not have to be ejected by a pressure pulse to form separate droplets in the air.

Figure 2:
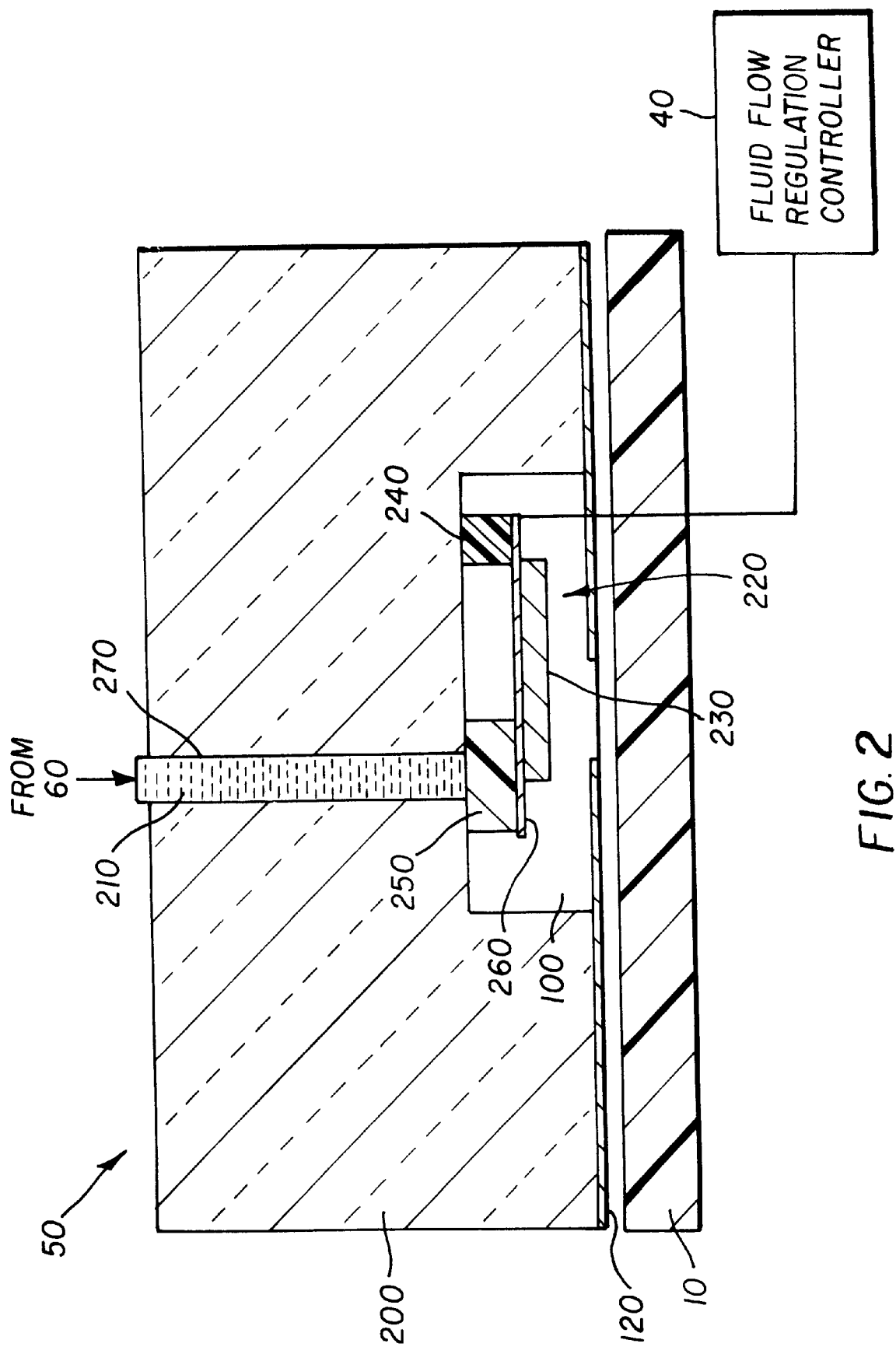
FIG. 2 is a cross-sectional view of the fluid delivery chamber in the fluid transfer apparatus in FIG. 1 showing a microvalve in its closed position.

An example is now described in relation to the fluid delivery chamber 100 in the fluid transfer device 50 in FIG. 1. In FIG. 2, the fluid delivery chamber 100 is shown to be fabricated on a substrate 200. The fluid delivery chamber 100 is shown to be connected to a microvalve 220 and a microchannel 270. The substrate 200 can be made of a semiconductor material such as silicon and germanium, or glass, metallic, and ceramic materials. The microchannel 270 is connected to the fluid reservoir 60 which provides fluid 210 to the fluid delivery chamber 100. A microbeam 260, supported by a pivotal support 240, is attached to a boss 250 which serves as a shutter to the microchannel 210. The microbeam 260 is attached to the piezo plate 230 which is controlled by electric signals from fluid flow regulation controller 40 that is further controlled by computer 30 (FIG. 1). The electric signals from fluid flow regulation control 40 control the deflection of a microbeam 260 and thus can switch a block or boss 250 (shutter) from a closed position and a plurality of open positions. The receiver substrate 10 is transported by motors 25 and 26 to be in close vicinity to the front plate 120. FIG. 1 shows the microvalve 220 in a closed position. Fluid 210 in the fluid delivery chamber 100 is blocked from microchannel 270.

Figure 3:
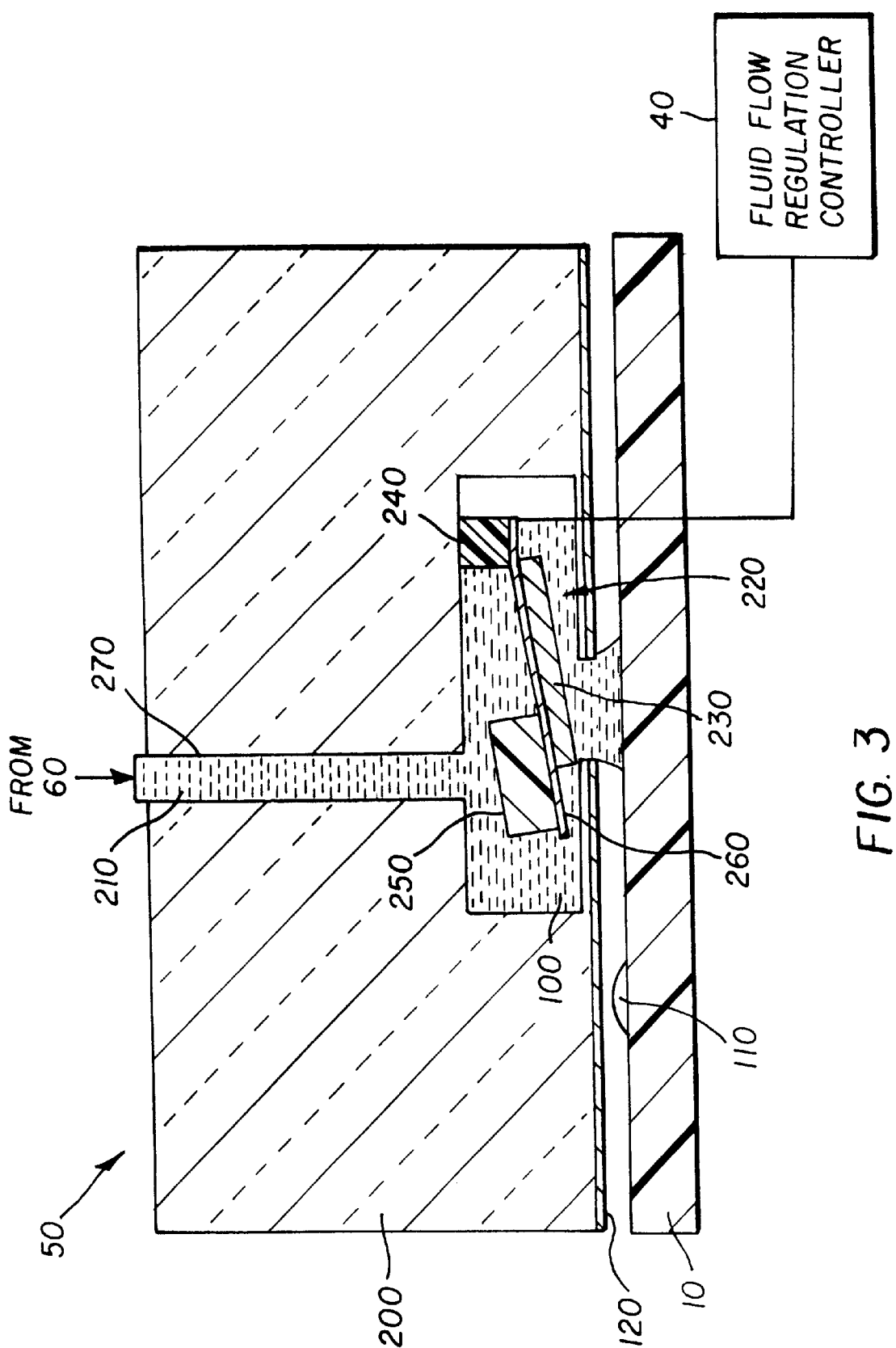
FIG. 3 is another cross-sectional view of the fluid delivery chamber in the fluid printing apparatus similar to FIG. 1 showing the microvalve in one of its open positions.

FIG. 3 shows another cross-sectional view of the same fluid delivery chamber 100 when the microvalve 220 is in one of a plurality of open positions. The fluid 210 is shown to flow into the fluid delivery chamber 100 to form a optical structure 110 the receiver substrate 10 that is adjacent to the front plate 120. The fluid flow is terminated when the microvalve 220 is switched back to the close position as shown in FIG. 2 after the correct amount of fluid is delivered. The time of the microvalve 220 spent at each open position is determined by the duration between the control signals. The microvalve 220 can be controlled by fluid flow regulation controller 40 to several open-valve positions which provide different degree of openings that regulates the flow or amount of the fluid 210 delivered to a delivery chamber.

The shape and size of the optical structure can be controlled by the following parameters: the open time and the position of the valve for the fluid transfer, the fluid pressure in the fluid reservoir 60 as controlled by the fluid pressure controller 45, the distance between the front plate 120 and the receiver substrate 10, the position of the receiver substrate 10, and the properties of the fluid such as viscosity and surface tension.

Many other types of fluid regulation means can be used for the present invention. One example is a microvalve comprising a bimetallically driven diaphragms as described in p26 Sensor, September, 1994. Other examples of regulators are described in U.S. Pat. Nos. 5,178,190; 5,238,223; 5,259,737; 5,367,878; and 5,400,824.

Although one fluid channel is shown to be connected with each fluid delivery channel in FIGS. 2 and 3, more than one fluid channels can be connected to an fluid delivery channel in accordance to the present invention. The fluids can be mixed in the fluid delivery chamber prior to being transferred to a receiver substrate 10.

Figure 4:
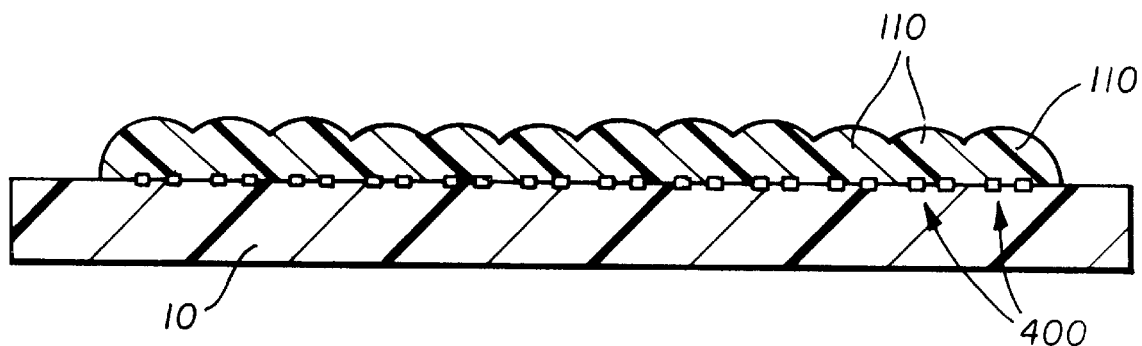
FIG. 4 is an illustration of a receiver substrate with an optical structure provided in accordance with the present invention.

The fluid transfer apparatus in accordance with the present invention can be used in many different applications for forming an optical structure on a receiver substrate. FIG. 4 illustrates one such example. Before the fluid transfer by the fluid transfer apparatus 5, the receiver substrate 10 is shown to comprise a composite of image elements 400 which together form a lenticular image display for perception of depth or motion. As it well known in the art, a lenticular image display needs to be viewed through proper optical lenses such as an array of parallel cylindrical lenticular lenses for obtaining the visual perception of motion or depth. The concepts for the methods and apparatus of lenticular images are disclosed in commonly owned U.S. Pat. Nos. 5,276,478 and 5,639,580, as well as commonly assigned U.S. patent application Ser. No. 08/986,950, filed, Dec. 8, 1997 (Docket 77056) entitled "Image Display and Audio Device".

FIG. 4 shows a cross-sectional view of the optical structure 110 that is an array of parallel cylindrical lenticular lenses. The fluid transfer apparatus 5 in accordance with the present invention is particularly suitable to producing the cylindrical lenses. The transfer of the fluid can be achieved in a continuous mode from the beginning to the end of each cylindrical lens as the receiver substrate 10 is transported by for example, motor 25 (FIG. 1). The size and the curvature of the cylindrical lens can be controlled by the parameters such as described above including the amount of fluid deposited and the treatment of the deposited fluid. It is understood that many lens types can be produced by the fluid transfer apparatus, these lenses can include spherical lens, square lens, etc., as well as many other optical devices as described above.

Another example is now described for the application of the fluid transfer apparatus 5. The fluid 210 in the fluid transfer apparatus 5 comprises optical materials that can form an optical guide once being fixed on the surface of the receiver substrate 10. The types of optical materials are as described above. The fluid transfer apparatus 5 transfers the fluid 210 in an image pattern that forms a two dimensional optical circuit on the surface of receiver substrate 10. The optical circuit can be used for guiding light waves for processing the optical signals in applications such as optical computing and optical communications.

The invention has been described in detail with particular reference to certain preferred embodiments thereof, but it will be understood that variations and modifications can be effected within the spirit and scope of the invention.

PARTS LIST 5 fluid transfer apparatus
10 receiver substrate
25 motor
26 motor
30 computer
40 fluid flow regulation controller
45 pressure controller
50 fluid transfer device
60 fluid reservoir
100 fluid delivery chamber
110 optical structure
120 front plate
130 UV light source
200 substrate
210 fluid
220 microvalve
230 piezo plate
240 pivotal support
250 block or boss
260 microbeam
270 microchannel
400 image element

What is claimed is:

1. Apparatus responsive to an input image for forming an optical structure such as a lens array on a receiver, comprising:
    a) a fluid delivery chamber having a fluid capable of forming the optical structure and including means for enabling the fluid chamber to deliver fluid to the receiver to form the optical structure;
    b) fluid channel for delivering the fluid to the fluid delivery chamber; and
    c) fluid flow regulation means for regulating the fluid flow to the fluid delivery chamber and from the delivery chamber to the receiver in response to the values of the input image and for positioning the receiver relative to the delivery chamber so as to form the desired optical structure.

2. The apparatus of claim 1 wherein the fluid regulation means includes a microvalve.

3. The apparatus of claim 2 wherein the microvalve includes piezo electric means effective in a first position for blocking the flow of fluid and in a plurality of second positions for regulating the amount of fluid delivered to a receiver from the delivery chamber in response to the values in the input image.

4. The apparatus of claim 1 further including a plurality of fluid reservoirs which store different fluids and such fluids are mixed in the fluid delivery chambers.

5. The apparatus of claim 1 wherein the optical structure includes a lens.

6. The apparatus of claim 1 wherein the receiver is provided with at least one an image display and the optical structure is disposed over the display image in readable relationship with such image.

7. The apparatus of claim 1 further including means for treating fluid delivered from the fluid delivery chamber to the receiver to form the optical structure.

8. The apparatus of claim 7 wherein the means for treating fluid delivered from the fluid delivery chamber includes using radiation, heating, or chemicals.

9. Apparatus responsive to an input image for forming an optical structure such as a lens array on a receiver, comprising:
    a) a plurality of fluid delivery chambers having a fluid capable of forming the optical structure;
    b) at least one fluid channel for delivering fluid to the fluid delivery chamber and including means for enabling the fluid chambers to deliver fluid to the receiver to form the optical structure;
    c) fluid flow regulation means for regulating the fluid flow to the fluid delivery chamber and from the delivery chamber to the receiver in response to the values of the input image including:
        i) means for positioning the receiver relative to the delivery chambers so as to sequentially deliver fluid to various positions on the receiver; and
        ii) pressure controller means for pressurizing fluids in each reservoir for delivering the fluid to the fluid delivery chambers; and
    d) means for treating the fluid delivered to the receiver to form the optical structure.

10. The apparatus of claim 9 wherein the fluid regulation means includes a microvalve.

11. The apparatus of claim 10 wherein the microvalve includes piezo electric means effective in a first position for blocking the flow of fluid and in a plurality of second positions for regulating the amount of fluid delivered to a receiver from the delivery chamber in response to the values in the input image.

12. The apparatus of claim 9 wherein the fluid reservoirs store different fluids and such fluids are mixed in the fluid delivery chambers.

13. The apparatus of claim 9 wherein the optical structure includes a lens.

14. The apparatus of claim 9 wherein the receiver is provided with at least one an image display and the optical structure is disposed over the display image in readable relationship with such image.

15. The apparatus of claim 9 further including means for treating fluid delivered from the fluid delivery chamber to the receiver to form the optical structure.

16. The apparatus of claim 15 wherein the means for treating fluid delivered from the fluid delivery chamber includes using radiation, heating, or chemicals.

* * * * *